(12) United States Patent
Friedrich et al.

(10) Patent No.: US 7,277,478 B2
(45) Date of Patent: Oct. 2, 2007

(54) METHOD FOR TRANSMITTING DATA BETWEEN A BASE STATION AND A TRANSPONDER

(75) Inventors: Ulrich Friedrich, Ellhofen (DE); Martin Fischer, Gleichen (DE)

(73) Assignee: Atmel Germany GmbH, Heilbronn (DE)

( * ) Notice: Subject to any disclaimer, the term of this patent is extended or adjusted under 35 U.S.C. 154(b) by 324 days.

(21) Appl. No.: 10/503,255

(22) PCT Filed: Jan. 15, 2003

(86) PCT No.: PCT/EP03/00325

§ 371 (c)(1),
(2), (4) Date: Aug. 30, 2004

(87) PCT Pub. No.: WO03/065286

PCT Pub. Date: Aug. 7, 2003

(65) Prior Publication Data

US 2005/0094720 A1     May 5, 2005

(30) Foreign Application Priority Data

Feb. 1, 2002    (DE)    ................................ 102 04 317

(51) Int. Cl.
*H04B 3/46* (2006.01)
(52) U.S. Cl. .................... 375/224; 375/219; 455/67.14
(58) Field of Classification Search ................ 375/219, 375/220, 224; 455/67.11, 67.14
See application file for complete search history.

(56) References Cited

U.S. PATENT DOCUMENTS

| | | | |
|---|---|---|---|
| 3,560,947 A | 2/1971 | Franchini | |
| 5,345,231 A | 9/1994 | Koo et al. | |
| 6,044,333 A | 3/2000 | Stobbe et al. | |
| 6,412,086 B1 * | 6/2002 | Friedman et al. | ........... 714/733 |
| 6,731,198 B1 * | 5/2004 | Stobbe et al. | ............ 340/10.33 |
| 6,882,826 B2 * | 4/2005 | Hediger et al. | ............ 455/41.1 |
| 2003/0133435 A1 | 7/2003 | Friedrich | |

FOREIGN PATENT DOCUMENTS

| | | |
|---|---|---|
| DE | 197 44 781 | 4/1999 |
| DE | 101 38 217 | 3/2003 |
| EP | 0777191 | 6/1997 |
| GB | 2253083 | 8/1992 |

OTHER PUBLICATIONS

Finkenzeller, RFID Handbuch, BNSDOCID:<XP 2249954A 1>; 1998; pp. 105-117.
*English Translation of* Finkenzeller, RFID Handbook, BNSDOCID: <XP 2249954A 1>; 1998; pp. 105-117.
Stadler, Erich; Modulationsverfahren (Modulation Methods), 3$^{rd}$ Edition, 1983, Würzburg, Vogel-Verlag publishers, ISBN 3-8023-0086-6, pp. 140-148.

* cited by examiner

*Primary Examiner*—Timothy Edwards, Jr.
(74) *Attorney, Agent, or Firm*—W. F. Fasse; W. G. Fasse

(57) ABSTRACT

In known methods for the transmission of data, the data transmission rate is reduced by bit errors especially at high carrier frequencies. In the new method, the data transmission rate can be significantly increased due to the increased reliability in the data transmission by means of the integration of a test signal.

19 Claims, 2 Drawing Sheets

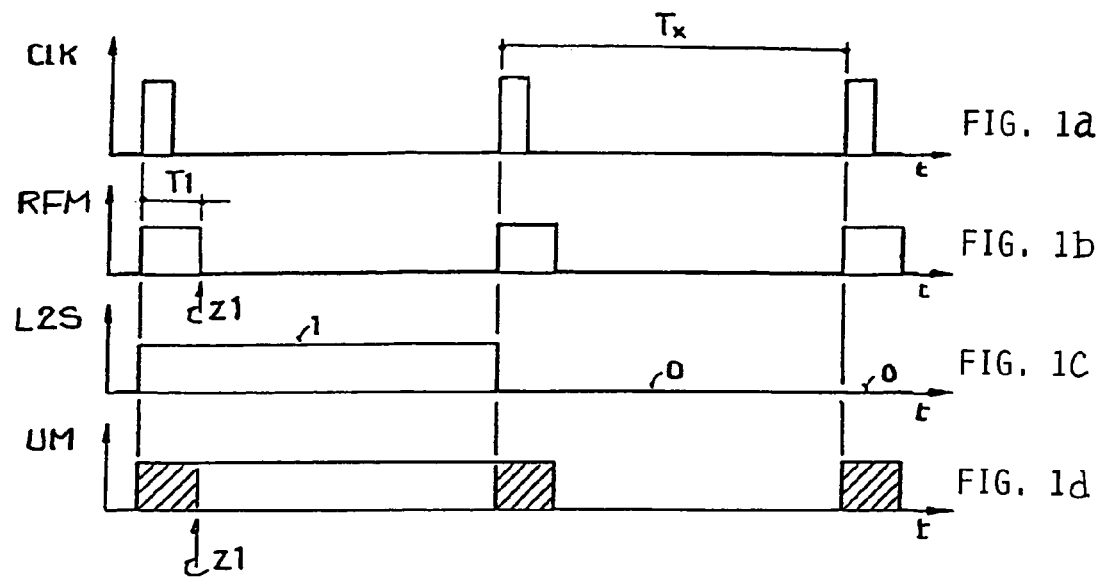
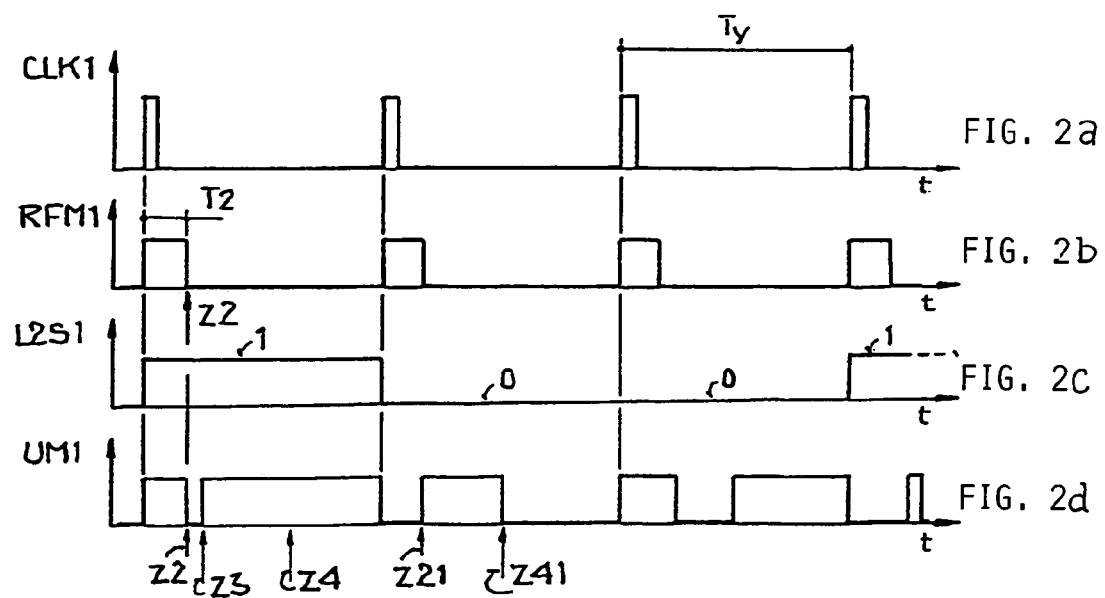

METHOD FOR TRANSMITTING DATA BETWEEN A BASE STATION AND A TRANSPONDER

FIELD OF THE INVENTION

The present invention relates to a method for the transmission of data between a base station and a transponder by a modulated electromagnetic wave.

BACKGROUND INFORMATION

Such a method is known from the publication DE 101 38 217.0. Therein, information packets are transmitted between a base station and a transponder. The information packets consist of a header section and a middle section with a data region. In the middle section, the data of the data region are encoded with the identifications allocated to the logic values of the information symbols in the header section. A disadvantage of the method is that disturbing or noisy interferences reduce the reliability of the data transmission in the communication due to reflections and/or absorptions when utilized in the range of UHF and higher. For the correction of the read errors, the entire data packet must be transmitted.

A further method is known from the publication EP 473,569 B1. Therein, digital data are exchanged between a base station and a passive transponder by means of an amplitude modulated carrier wave. The individual bits of a data word consist of a time span or interval in which the electromagnetic field is switched on and a time span or interval in which the electromagnetic field (field gap or notch) is switched off, whereby the field gap serves as a separator between two successive bits. The logic value of the bits is determined by the length of the time in which the electromagnetic field is switched on. The fixed time amount of the field gap is summed or additionally counted for the total time for the representation of the individual bits. Furthermore, in the passive system, the energy for the transponder is acquired out of the carrier field by means of absorption modulation.

A further method is known from the publication EP 0,777,191 A1. Therein, data are transmitted by means of a PWM modulated carrier wave, whereby the logic values of the bits are represented by various different time lengths, and the carrier field is briefly switched on for the separation of the individual bits at the end of a time interval in the so-called forward link. Furthermore, various different encoding methods for the transmission of digital data are known from Finkenzeller, "RFID Handbuch" ("RFID Handbook"), especially page 106 et seq. and the publication U.S. Pat. No. 3,560,947.

Due to the increasing security or safety demands, a plurality of information packets must be modulated onto a carrier wave in ever-shorter time spans or intervals. Preferably an amplitude modulation (ASK) is used for the modulation. In order to achieve a higher data transmission rate and a higher transmission distance or range, carrier frequencies in the range of UHF and microwaves are being increasingly utilized in the field of the transponders. The basic foundation of the bi-directional data transmission between transponder and base station is formed by a data protocol, which, among other things, sets or fixes the number of the information symbols, such as for example the logic values per data bit, and also defines the identification of the individual symbols. Especially in the UHF range, read errors arise in the data transmission due to change or variation of the transmission conditions as a result of reflections and the constructive and destructive interferences associated therewith. Because this results in a repeated transmission of the data word, the effective data transmission rate is considerably reduced.

A disadvantage of the previous methods is that the effective data transmission rate is reduced due to the transmission errors especially in the range of very high frequencies due to the fluctuating transmission conditions. This reduction of the data transmission rate is noticeable in a disturbing or interfering manner in time-critical applications. It is an object of the present invention to set forth a method for the transmission of data, which increases the reliability of the data transmission and can be carried out in a simple and economical manner.

SUMMARY OF THE INVENTION

This object is achieved according to the invention in a method for the transmission of data between a base station and a transponder by means of an electromagnetic wave, in which an information packet is modulated onto this electromagnetic wave, which information packet comprises a data section with a data word and that is embodied as a sequence of bits, to the logic value of which a modulation state is respectively allocated, whereby respectively one bit of the bit sequence is transmitted in the time interval generated by means of one of two successive clock pulses, characterized in that in addition to the clock pulses, a test signal for the testing of the transmitted logic value is transmitted with a prescribed time duration, during the time interval, and a time constant modulation state is allocated to the test signal.

The above object is further achieved according to the invention in a modulation control arrangement for carrying out the inventive method, comprising a sample/hold unit in which is stored a first voltage value that is proportional to the time duration of the test signal, an integration unit that provides a second voltage value proportional to the duration of a charging current of a constant current source, a comparator for the comparison of the first voltage value with the second voltage value, a modulation control unit for generating the modulation state of the electromagnetic wave dependent on an output signal of the comparator and the bit sequence of the data word and for resetting the integration unit.

The above object is still further achieved according to the invention in a modulation control arrangement for carrying out the inventive method, comprising a memory unit, in which a time point determined by the duration of the test signal is stored, a multiplexer that switches between time points that are allocated to the logic values of the bits that are to be transmitted and the time point allocated to the duration of the time interval and outputs the time point, a counter unit that provides a time point proportional value, a comparator for comparing the value of the multiplexer and the value of the counter, and a modulation control unit for generating the modulation state of the electromagnetic wave dependent on an output signal of the comparator and the bit sequence of the data word.

Accordingly, the essence of the invention consists in that the reliability is increased in connection with an additional test signal in a transmission. For this purpose, information packets are modulated onto an electromagnetic wave by a base station and a transponder. The information packet comprises a data section with a data word, whereby the data word is embodied as a sequence of bits, to the logic value of which a modulation state is respectively allocated, and in which respectively one bit of the bit sequence is transmitted by means of a time interval generated from two successive timing or clock pulses. Moreover, during the time interval, a test signal with a prescribed time duration is generated, and a time-constant modulation state is allocated to the test signal. In this regard, investigations of the applicant have shown that it is advantageous to insert the test signal at the beginning of a time interval.

It is an advantage of the method that, by means of the insertion of the test signal, independently of the modulation method, a prescribed modulation state is given, which can be used as a reference point for the determination of the logic value of the bit. Thereby, the duration of the test signal is given and can be communicated to the receiver in the header section of the respective information packet. A further advantage is that the duration of the test signal is independent of the length of the time interval.

In a further embodiment of the method, for the decoding of the received bit sequence, the logic value of the bit transmitted in th etime interval is derived from its modulation state in a time point determined by the duration of the test signal. Further it is advantageous to allocate a prescribed modulation state to the test signal during the transmission of a data section. Thereby, the detection of the modulation state during an entire time interval by means of integration methods is omitted. Since the likelihood of the detection of a bit error, especially in the range of UHF, through an undesired change of the modulation state as a result of reflections is substantially reduced, the reliability of the data transmission and the effective data transmission rate are substantially increased. Furthermore, bit errors can be recognized and immediately corrected, already during the transmission of the respective time interval, from the modulation state that is prescribed at a predetermined time point. The correction is checked after the completion of the transmission of the data word by means of one or more test bits (CRC region). Investigations of the applicant have shown that a substantial increase of the effective data transmission rate is achieved hereby.

Furthermore, other investigations of the applicant have shown that the control of the modulation state in connection with the transmission of a test signal in the header section can be carried out in a simple manner by means of a so-called "peek detector", and the current consumption can be reduced through the saving or avoiding of a complicated and costly time measuring unit. Thereby, the communication distance or range is increased especially for passive transponders.

BRIEF DESCRIPTION OF THE DRAWINGS

The inventive apparatus shall be explained in the following on the basis of the example embodiments in connection with several schematic drawings. It is shown by:

FIG. 1a a first timing or clock signal for a data transmission, and

FIG. 1b a time-limited test signal, and

FIG. 1c a bit sequence of a data word that has been transmitted, and

FIG. 1d the time course of the modulation state, and

FIG. 2a a second timing or clock signal, and

FIG. 2b a test signal, and

FIG. 2c a bit sequence of a data word that is to be transmitted, and

FIG. 2d a modulation signal, and

DETAILED DESCRIPTION OF PREFERRED EXAMPLE EMBODIMENTS OF THE INVENTION

Figure 3:
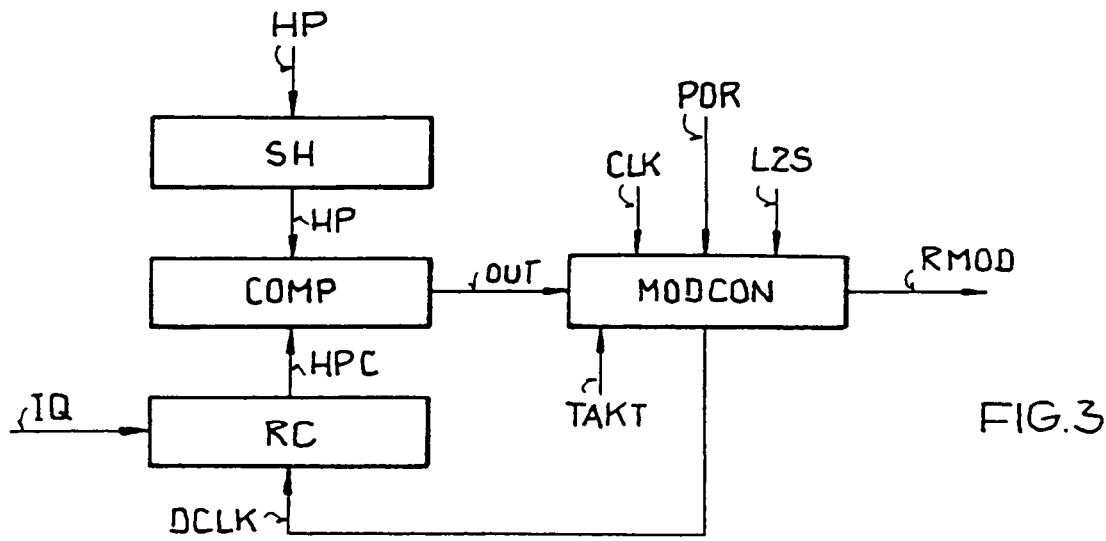
FIG. 3 a first arrangement or apparatus for the control of the time course of the modulation state, and FIG. 4 a second apparatus or arrangement for the control of the time course of the modulation state.

With reference to the time courses of the signals illustrated in the FIGS. 1a–1d or 2a–d, the relationship between a test signal RFM and a data signal L2S in a sychronous data transmission is explained, as it is needed for the generation of the time variation or change of the modulation of an electromagnetic wave. In this context, for example, a modulated electromagnetic wave is transmitted from a base station, from which electromagnetic wave a timing or clock signal CLK is extracted in a transponder. Subsequently, the electromagnetic wave of the base station is modulated in the transponder. For this purpose, especially at high frequencies for example in the range of UHF, the reflected wave is modulated through a phase and/or amplitude modulation by means of a modulation control unit. In this context, in the FIGS. 1a–1d the introduction of the test signal is shown in connection with a static modulation method, in the FIGS. 2a–2d the integration of the test signal is shown with a dynamic modulation method, whereby no fixed allocations to a modulation state are prescribed for the logical one and of the logical zero. Rather, the two logic values define themselves as time points relative to the duration of the time interval Ty or from a sequence of modulation variations or changes that occur at certain time points.

In the following, the FIGS. 1a to 1d are explained. In the FIG. 1a, the course of a timing or clock signal CLK is illustrated. In this regard the time course of the voltage of the individual clock pulses is illustrated, whereby respectively two successive voltage pulses define a time interval Tx. Furthermore, the course of the test signal RFM is illustrated in the FIG. 1b. It respectively begins with each clock signal CLK and ends after a given time T1. While the signal RFM is applied or prevails, it comprises a constant value. A bit sequence L2S that is to be transmitted is illustrated as a part of a data word in the FIG. 1c. In this regard, the modulation state during the time interval Tx is applied as a high level for a logic one and as a low level for a logic zero. The course of the modulation state is illustrated in the FIG. 1d. In this regard, during the time duration T1, a high level is prescribed by the test signal at the beginning of each time interval. Thereafter, the modulation state changes at the time point z1 only when a logic zero is transmitted next thereafter. At the end of the interval Tx, the modulation state changes from low to high insofar as a logic zero was transmitted.

An advantage of the invention is that, through the test signal, the logic value of the respective transmitted bit is extracted in the receiver through detection of the modulation change and of the modulation state at the time point Z1. If a different change of the modulation state other than from high to low exists at the time point Z1, then a bit error is determined and immediately corrected, that is to say the detected logic state one is corrected to a logic state zero.

In the following, the FIGS. 2a–2d are explained. In the FIG. 2a, the time course of the timing or clock signal CLK1 is illustrated. In this regard, a time interval Ty is defined from respectively two successive timing or clock signals CLK1. In the FIG. 2b, the time course of a test signal RFM1 is illustrated. It respectively begins anew with each clock signal CLK 1 and ends after a prescribed time T2. The value of the test signal RFM1 changes from high to low at the time point Z2. A bit sequence L2S1 that is to be transmitted is shown as part of a data word in the FIG. 2c, whereby a high level is allocated to a logic one during the entire time interval Ty and a low level is allocated for logic zero.

The course or progression of the modulation state resulting from the FIGS. 2a–2c is illustrated in the FIG. 2d: in the present example of a dynamic modulation method, the time point Z3, that is to say one quarter of the time interval Ty, is allocated to the logic one, and the time point Z4, that is to say one half of the time interval Ty, is allocated to the logic zero. Insofar as the modulation state was low before the first illustrated time interval, it changes to the modulation state high at the beginning of the first illustrated time interval until the time point Z2. Thereafter, the modulation state changes at the time point Z3 because a logic one is transmitted. At the end of the first time interval, the modulation state changes. In the second time interval, the modulation state changes at the time point Z21 and at the time point Z41 because a logic zero is transmitted. In this regard it becomes clear that the logic value of the bit that is to be transmitted is given from the change of the modulation state at defined time points. Through the introduction of the test signal RFM, an additional information is provided, that can be used for the testing whether an undesired modulation state change is present. Hereby a bit error can be detected with high reliability and, if applicable, corrected, within the respective time interval Ty.

FIG. 3 shows an apparatus for the integration of a test signal to each bit of a bit sequence of a data word. For this purpose, a value of a charge voltage of a capacitance with a known time constant is allocated to the time length of the test signal. In this regard, the charge time constant of the capacitance to be charged, for example arranged in a transponder, is known in the transmitter, for example a base station. In order to notify the transponder of the time length of the test signal that is to be integrated in its reply signal, a voltage value HP allocated to the time length of the test signal is transmitted by the base station in the header section of an information packet. In the transponder, the voltage value HP is stored in a sample/hold or memory unit SH. From the memory unit SH, the voltage value HP is provided to a comparator COMP. Simultaneously, the charge voltage HPC is applied to the comparator COMP. The charge voltage HPC is advantageously increased proportional to time by a current source IQ. If the voltage value HPC exceeds the voltage value HP, this is reported or communicated to a control unit MODGON by the comparator by means of an output OUT by changing a voltage level prevailing at the output OUT. Moreover, a reset input POR, a data input L2S, which provides the bit sequence of the data word that is to be sent, a system clock input TAKT and a data clock input CLK are connected to the control unit MODCON, which determines the time course or progression of the modulation states of the reply signal by means of an output RMOD. Furthermore, the discharging time point of the capacitance RC is controlled by the control unit MODCON by means of an output DCLK. Through the output DCLK, in this regard, the capacitance RC is discharged dependent on the time points derived from the data clock CLK extracted out of the received wave of the base station. Hereby, the level at the output OUT of the comparator COMP varies.

It is an advantage of the apparatus or arrangement that the length of the test signal can be changed in a simple manner through the height or magnitude of a value, and that the test signal can be integrated into an existing control unit in a current-saving manner through the small or low required additional circuit effort, complexity or expense.

Figure 4:
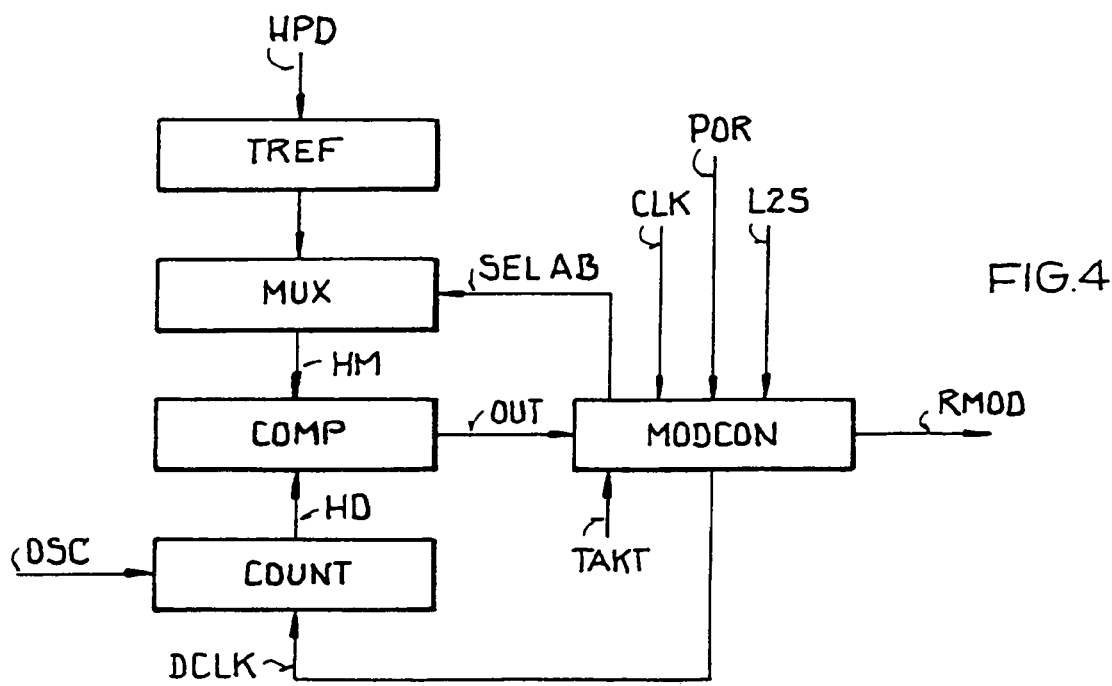

A further apparatus or arrangement for the integration of a test signal to each bit of a bit sequence of a data word is illustrated in the FIG. 4. In the explanation of the drawings, only the differences relative to the embodiment of the FIG. 3 are represented. The time length of the test signal HPD extracted out of the header section of the information packet is stored as a value in the storage or memory unit TREF. The value is provided to a multiplexer MUX. Furthermore, the multiplexer receives a signal SELAB delivered from the control unit MODCON. The values of the signal SELAB are generated by the control unit corresponding to the logic values of the bits, in that a time point is allocated to each logic value, whereby this time point is determined by a fractional portion of the length of the time interval defined between two successive data clock pulses CLK. The multiplexer makes the values HM, ordered according to their size or magnitude, available to the comparator COMP. Simultaneously the value HD of a counter unit COUNT is applied to the comparator. In this regard, the counter is counted-up by means of an oscillator OSC and reset by means of the signal DCLK with each data clock signal CLK. If the value HD exceeds the value HM, the voltage level at the output of the comparator COMP changes.

It is an advantage of the apparatuses, that by these apparatuses, in a simple manner, a test signal can be integrated into a data transmission independent of the respective modulation method. Thereby, the effective data transmission rate is considerably increased. Moreover, both control apparatus can be carried out or embodied in a very current-saving manner.

The invention claimed is:

1. A method for the transmission of data between a base station (BS) and a transponder (TR) by means of an electromagnetic wave, in which an information packet (IP) is modulated onto this electromagnetic wave, which information packet comprises a data section (DA) with a data word and that is embodied as a sequence of bits, to the logic value of which a modulation state is respectively allocated, whereby respectively one bit of the bit sequence is transmitted in the time interval (TX) generated by means of one of two successive clock pulses, characterized in that in addition to the clock pulses, a test signal (RFM) for the testing of the transmitted logic value is transmitted with a prescribed time duration (T1), during the time interval (TX), and a time constant modulation state is allocated to the test signal (RFM).

2. The method according to claim 1, characterized in that the test signal (RFM) is inserted at the beginning of a time interval (TX).

3. The method according to claim 1, characterized in that the logic value of the bit transmitted in the time interval (TX) is derived from the change of the modulation state in a time point determined by the duration of the test signal (RFM).

4. The method according to claim 1, further comprising recognizing and correcting bit errors during the transmission of the data word.

5. A modulation control arrangement for carrying out the method according to claim 1, comprising a sample/hold unit (SH) in which is stored a first voltage value proportional to the time duration of the test signal (RFM), an integration unit (RC) that provides a second voltage value proportional to the duration of a charging current of a constant current source (IQ), a comparator (COMP) for comparing the first voltage value with the second voltage value, a modulation control unit (MOD_CON) for generating the modulation state of the electromagnetic wave dependent on an output signal (OUT) of the comparator (COMP) and the bit sequence of the data word (L2S) and for resetting the integration unit (RC).

6. A modulation control arrangement for carrying out the method according to claim 1, comprising a memory unit (TREF), in which a time point determined by the duration of the test signal (RFM) is stored, a multiplexer (MUX) that switches between time points that are allocated to the logic values of the bits that are to be transmitted and the time point allocated to the duration of the time interval (TX) and outputs the time point, a counter unit (COUNT) that provides a time point proportional value, a comparator (COMP) for comparing the value of the multiplexer (MUX) and the value of the counter (COUNT), and a modulation control unit for generating the modulation state of the electromagnetic wave dependent on an output signal (OUT) of the comparator (COMP) and the bit sequence of the data word (L2S).

7. The method according to claim 1, characterized in that, for the decoding of the received bit sequence, the logic value of the bit transmitted in the time interval (TX) is derived from its modulation state in a time point determined by the duration of the test signal (RFM).

8. The method according to claim 1, characterized in that a predetermined modulation state is allocated to the test signal (RFM) during the transmission of a data section.

9. A method of transmitting data between a base station and a transponder via an electromagnetic wave, comprising the steps:
   a) providing successive clock pulses that define successive time intervals extending respectively from one to a next of said clock pulses;
   b) providing a test signal including successive test signal pulses each respectively having a prescribed time duration during a respective time interval of said successive time intervals, wherein each said test signal pulse has a time constant modulation state during said prescribed time duration thereof;
   c) providing a bit sequence of bits that form an information packet including a data section with a data word made up of a succession of said bits, wherein said bits respectively represent logic values and wherein each one of said logic values has a respective modulation state allocated thereto;
   d) generating a modulation signal dependent on and responsive to said clock pulses, said test signal, and said bit sequence; and
   e) modulating said modulation signal onto said electromagnetic wave to produce a modulated electromagnetic wave, and transmitting said modulated electromagnetic wave, such that a respective one of said test signal pulses and a respective one of said bits having a respective one of said logic values is transmitted during each respective one of said time intervals.

10. The method according to claim 9, wherein each one of said test signal pulses commences at a beginning of a respective one of said time intervals.

11. The method according to claim 9, further comprising receiving and decoding said modulated electromagnetic wave, and using said test signal pulses in said decoding to test accuracy of said logic values as transmitted in said modulated electromagnetic wave.

12. The method according to claim 9, further comprising receiving said modulated electromagnetic wave, and decoding said bit sequence from said modulated electromagnetic wave by determining said logic value of a respective one of said bits from a respective modulation state of said modulated electromagnetic wave at a time point determined by said prescribed time duration of said test signal pulse in the one of said time intervals during which said respective bit is transmitted.

13. The method according to claim 9, further comprising receiving said modulated electromagnetic wave, and decoding said bit sequence from said modulated electromagnetic wave by determining said logic value of a respective one of said bits from a respective change of a modulation state of said modulated electromagnetic wave at a time point determined by said prescribed time duration of said test signal pulse in the one of said time intervals during which said respective bit is transmitted.

14. The method according to claim 9, wherein said information packet further comprises a header section in which said prescribed time duration of said test signal pulses is defined.

15. The method according to claim 9, wherein said prescribed time duration is independent of and shorter than said time interval.

16. The method according to claim 9, wherein said time constant modulation state is a predetermined modulation state that is allocated to said test signal pulses of said test signal during transmitting of said data section.

17. The method according to claim 9, further comprising a step of recognizing and correcting a bit error during transmitting of said data word.

18. A modulation control arrangement for generating a modulated electromagnetic wave dependent on and responsive to a clock signal, a test signal and a bit sequence, said arrangement comprising:
   a sample/hold unit adapted to store a first voltage value proportional to a prescribed time duration of a test signal pulse of said test signal;
   a constant current source having an output adapted to provide a charging current;
   an integration unit having an input connected to said output of said constant current source, and having an output adapted to provide a second voltage value proportional to a duration of said charging current of said constant current source;
   a comparator having a comparator output, a first input connected to an output of said sample/hold unit, and a second input connected to said output of said integration unit, wherein said comparator is adapted to compare the first voltage value with the second voltage value and to produce a comparator output signal responsive thereto at said comparator output of said comparator; and
   a modulation control unit having a first input connected to said comparator output of said comparator, a second input adapted to receive the clock signal, a third input adapted to receive the bit sequence, a reset output connected and adapted to provide a reset signal to a reset input of said integration unit, and a modulation signal output adapted to provide a modulation signal dependent on said comparator output signal and said bit sequence.

19. A modulation control arrangement for generating a modulated electromagnetic wave dependent on and responsive to a clock signal, a test signal and a bit sequence, said arrangement comprising:
   a memory unit adapted to store a first time point determined by a duration of a test signal pulse of said test signal;

a multiplexer having an input connected to an output of said memory unit, and being adapted to switch between respective time points allocated to logic values of bits of said bit sequence and a time point allocated to a duration of a time interval determined by successive clock signal pulses of said clock signal, and having an output adapted to provide a selected time point;

a counter unit having an output adapted to provide a count value proportional to a time point;

a comparator having a comparator output, a first input connected to said output of said multiplexer, and a second input connected to said output of said counter unit, wherein said comparator is adapted to compare the selected time point at said output of said multiplexer with said count value at said output of said counter unit and to produce a comparator output signal responsive thereto at said comparator output of said comparator; and a modulation control unit having a first input connected to said comparator output of said comparator, a second input adapted to receive the clock signal, a third input adapted to receive the bit sequence, a reset output connected and adapted to provide a reset signal to a reset input of said counter unit, and a modulation signal output adapted to provide a modulation signal dependent on said comparator output signal and said bit sequence.

* * * * *

UNITED STATES PATENT AND TRADEMARK OFFICE
CERTIFICATE OF CORRECTION

PATENT NO. : 7,277,478 B2  
APPLICATION NO. : 10/503255  
DATED : October 2, 2007  
INVENTOR(S) : Friedrich et al.

It is certified that error appears in the above-identified patent and that said Letters Patent is hereby corrected as shown below:

<u>Title page</u>,  
Item (56) References Cited  
under "FOREIGN PATENT DOCUMENTS"  
insert --EP 0473569  03/1992--;

under "OTHER PUBLICATIONS"  
insert --C. K. Chow and C. D. Cullum, "Coded Clock Modulation"; IBM Technical Disclosure Bulletin, Vol. 11, no. 11, April 1969, pages 1504-1505, XP002240527, New York, US-- insert --STADLER, Erich; Modulationsverfahren (Modulation Methods), $3^{rd}$ Edition, 1983, Würzburg, Vogel-Verlag publishers, ISBN 3-8023-0086-6, pages 142-145 (English Translation)--

<u>Column 3</u>,  
Line 18, before "interval" replace "th etime" by --the time--;

<u>Column 5</u>,  
Line 46, after "unit", replace "MODGON" by --MODCON--;

<u>Column 7</u>,  
Line 25, after "claim", replace "1" by --7--.

Signed and Sealed this

First Day of July, 2008

JON W. DUDAS  
*Director of the United States Patent and Trademark Office*